United States Patent
Bingel et al.

(10) Patent No.: US 7,548,088 B2
(45) Date of Patent: *Jun. 16, 2009

(54) SYSTEMS AND METHODS FOR CURRENT MANAGEMENT FOR DIGITAL LOGIC DEVICES

(75) Inventors: Thomas J. Bingel, Indian Rocks Beach, FL (US); Deanne Tran, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 402 days.

This patent is subject to a terminal disclaimer.

(21) Appl. No.: 11/340,245

(22) Filed: Jan. 26, 2006

(65) Prior Publication Data

US 2007/0182598 A1    Aug. 9, 2007

(51) Int. Cl.
*H03K 17/16* (2006.01)
*H03K 19/003* (2006.01)

(52) U.S. Cl. .............................. 326/33; 326/27; 326/31; 327/538; 327/545

(58) Field of Classification Search ................... 326/21, 326/26–27, 31, 33; 327/538, 545
See application file for complete search history.

(56) References Cited

U.S. PATENT DOCUMENTS

| | | | | |
|---|---|---|---|---|
| 6,040,707 A | * | 3/2000 | Young et al. | 326/21 |
| 6,967,853 B2 | * | 11/2005 | DeFazio et al. | 363/49 |
| 7,076,384 B1 | | 7/2006 | Radulov et al. | |
| 7,427,873 B2 | * | 9/2008 | Bingel et al. | 326/33 |
| 7,428,465 B2 | * | 9/2008 | Bingel et al. | 702/107 |

* cited by examiner

*Primary Examiner*—Vibol Tan
*Assistant Examiner*—Jason Crawford
(74) *Attorney, Agent, or Firm*—Fogg & Powers LLC

(57) ABSTRACT

Systems and methods for current management for digital logic devices are provided. In one embodiment, a method of current management for a digital logic circuit comprises drawing power to drive a digital logic integrated circuit; determining a priori information about an impending current need of the digital logic integrated circuit; and controlling a bypass current in parallel with the digital logic integrated circuit based on the a priori information, wherein the bypass current is controlled to reduce discontinuities in the current supplied by a power supply.

20 Claims, 4 Drawing Sheets

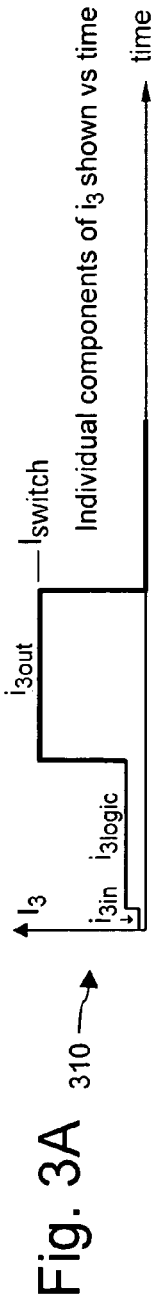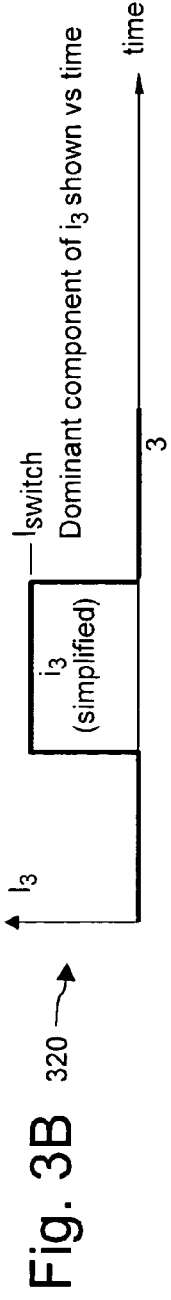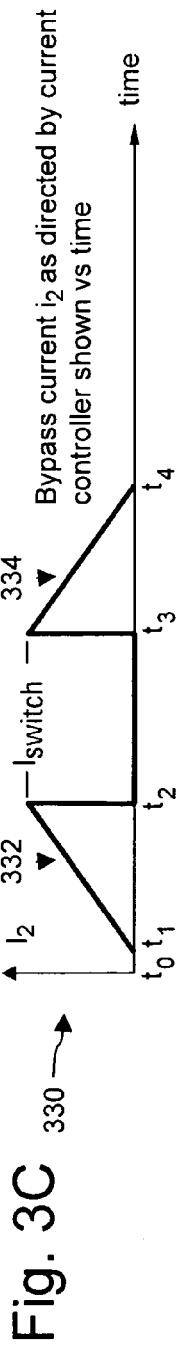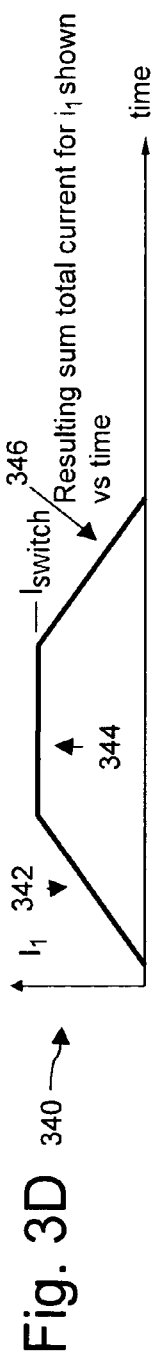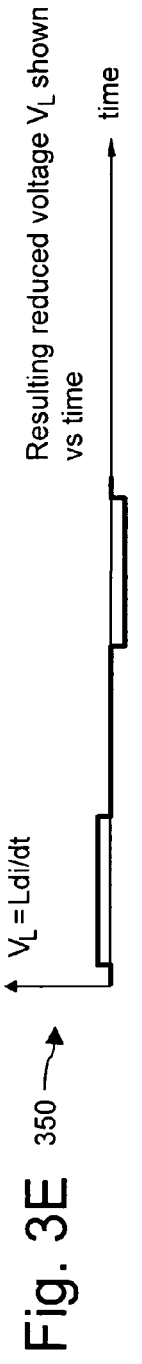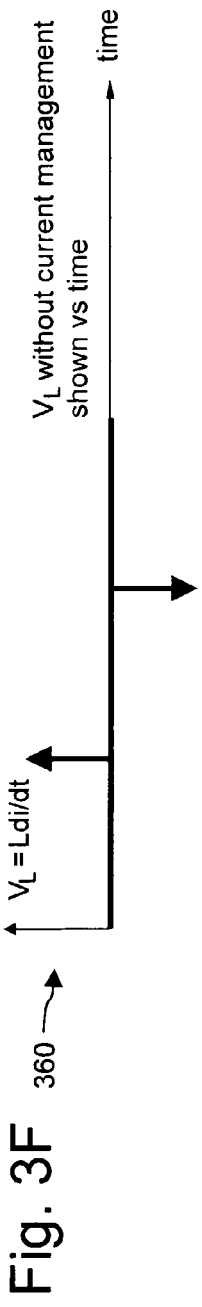
Fig. 3A 310
Fig. 3B 320
Fig. 3C 330
Fig. 3D 340
Fig. 3E 350
Fig. 3F 360

SYSTEMS AND METHODS FOR CURRENT MANAGEMENT FOR DIGITAL LOGIC DEVICES

CROSSREFERENCES

This application is also related to the following co-pending U.S. patent applications filed on even date herewith, which are incorporated herein by reference:

U.S. patent application Ser. No. 11/340,285 (entitled "Systems and Methods for Current Management for Digital Logic Devices") and which is referred to herein as the '085Application; and U.S. patent application Ser. No. 11/340,287 (entitled "Testing Control Methods for Use in Current Management Systems for Digital Logic Devices") and which is referred to herein as the '090Application.

TECHNICAL FIELD

The present invention generally relates to digital logic circuits and more specifically to current management for digital logic devices.

BACKGROUND

In the current state of the art, digital logic power-supply decoupling is achieved using decoupling capacitors. A digital logic device, due to its discrete nature, switches logic states between on and off. This digital switching causes transient currents to be generated, which must be supplied by the power distribution system. Typically, decoupling capacitors in proximity to the digital logic are used to supply the transient current. However, parasitic inductances are always present between the digital logic and the decoupling capacitor. These inductances react to changes in digital logic device current demand by producing voltages that impede the ability of decoupling capacitors to supply transient current to the digital logic. In simulations, it is apparent that this parasitic inductance is the prime limitation to the success of the decoupling capacitor in achieving its function—that of ensuring the power-supply voltage at the digital logic remains fixed at all times. Little has changed in the past 40 years, except incremental means of reducing the parasitic inductance between digital-logic integrated circuits and decoupling capacitors.

For the reasons stated above and for other reasons stated below which will become apparent to those skilled in the art upon reading and understanding the specification, there is a need in the art for improved systems and methods for current management for digital logic devices.

SUMMARY

The Embodiments of the present invention provide methods and systems for current management for digital logic devices and will be understood by reading and studying the following specification.

In one embodiment, a current management system for a digital logic circuit is provided. The system comprises a controllable current sink connected in parallel with a digital logic integrated circuit and adapted to draw a bypass current based on a control signal; a current controller responsive to the digital logic integrated circuit, the current controller adapted to output the control signal to the controllable current sink; and wherein the current controller is adapted to ramp the bypass current to a switching level based on a priori information about an impending current need of the digital logic integrated circuit and further adapted to ramp the bypass current from the switching level to a steady state level after the impending current need of the digital logic integrated circuit is completed.

In another embodiment, a method of current management for a digital logic circuit is provided. The method comprises drawing power to drive a digital logic integrated circuit; determining a priori information about an impending current need of the digital logic integrated circuit; and controlling a bypass current in parallel with the digital logic integrated circuit based on the a priori information, wherein the bypass current is controlled to reduce discontinuities in the current supplied by the power supply.

In yet another embodiment, a current management system for a digital logic circuit is provided. The system comprises means for supplying current to a digital logic integrated circuit; means for drawing a bypass current from the means for supplying current, the means for drawing a current connected electrically in parallel with the digital logic integrated circuit; and means for controlling the means for drawing a bypass current, the means for controlling adapted to control the bypass current based on a priori information about an impending current need of the digital logic integrated circuit, wherein the bypass current is controlled to reduce discontinuities in the current supplied by the means for supplying current.

DRAWINGS

Embodiments of the present invention can be more easily understood and further advantages and uses thereof more readily apparent, when considered in view of the description of the preferred embodiments and the following figures in which.

Figure 4:
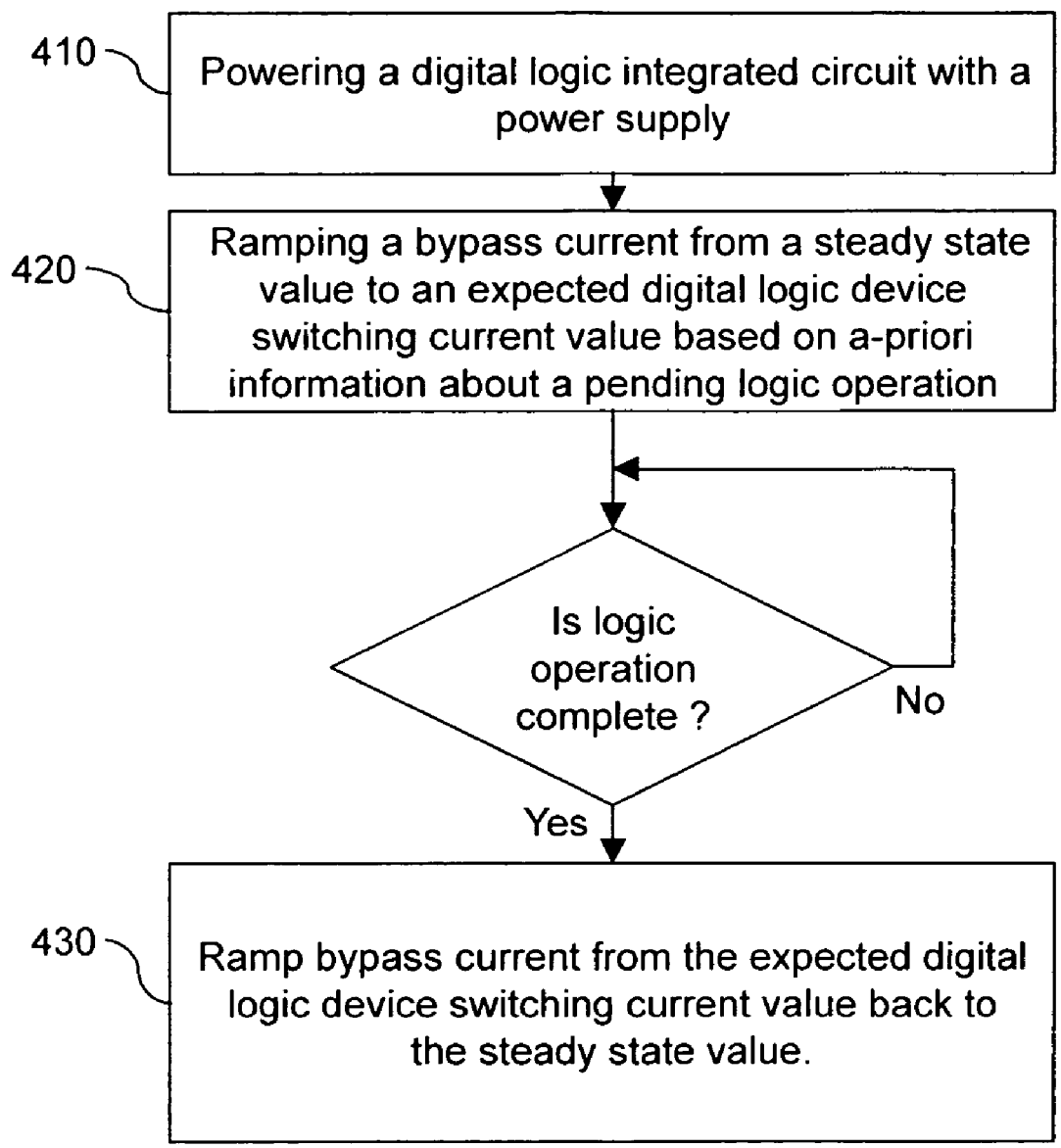

FIGS. 3A-3F provide a series of charts illustrating current magnitudes within a current management system of one embodiment of the present invention; and FIG. 4 is a flow chart illustrating a method of one embodiment of the present invention.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide methods and systems for current management for digital logic devices. Embodiments of the present invention comprise systems and methods of reducing current demand variations on digital logic power supplies caused by digital logic switching, and thereby reduce impediments caused by parasitic inductance. Because the voltage developed across a parasitic inductance is equal to L times the change in current with respect to time, and the parasitic inductance is generally minimized, but never zero, embodiments of the present invention use: 1) a priori information about the impending current needs, and 2) current management circuitry to operate in parallel with the digital logic circuitry. The a priori information is used to ramp up or down the power supply current in advance of a digital-logic switching event to reduce di/dt, and thus reduce the transient parasitic voltage drop in the power supply system that would normally result.

Figure 1:
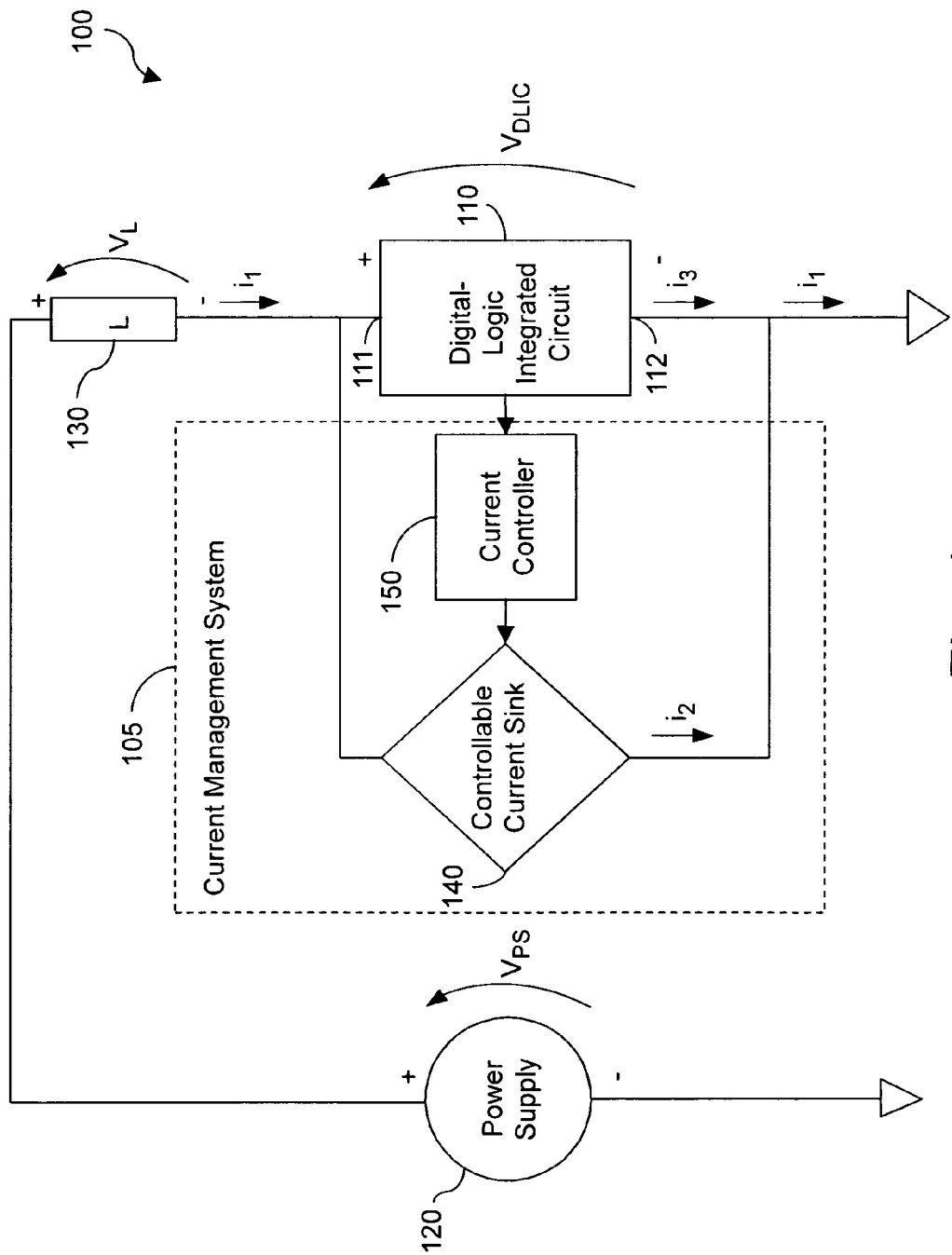
FIG. 1 is a diagram illustrating a current management system of one embodiment of the present invention.

FIG. 1 is a block diagram illustrating a system 100 for managing current, of one embodiment of the present invention. System 100 comprises a digital logic integrated circuit 110 coupled to receive power ($V_{ps}$) from a digital logic power supply 120. In one embodiment, digital logic integrated circuit 110 is a small-scale integrated circuit (SSI) comprising gates that perform simple functions such as, but not limited to, AND, NAND, OR, NOR and INVERTER. In alternate embodiments, digital logic integrated circuit 110 comprises a high performance processor, such as, but not limited to, a microprocessor, and a digital signal processor. System 100 further comprises a current management system 105. In one embodiment, current management system 105 includes a controllable current sink 140 and a current controller 150. Controllable current sink 140 is coupled in parallel with power connections 111 and 112 of digital logic integrated circuit 110 as shown. Controllable current sink 140 is further coupled to receive a control signal from a current controller 150, which in one embodiment is coupled to digital logic integrated circuit 110.

In operation, when digital logic integrated circuit 110 performs a logic switching operation, the change in current demand ($i_3$) of digital logic integrated circuit 110 is approximated by a step response, as illustrated generally by FIG. 3B at 320. In the absence of current management system 105, parasitic inductances 130 between digital logic integrated circuit 110 and power supply 120 respond to such an abrupt change in current by generating a voltage response ($V_L=Ldi_1/dt$) as illustrated by FIG. 3F at 360. The generation of $V_L$ in between power supply 120 and digital logic integrated circuit 110 causes fluctuations in the voltage ($V_{DLIC}$) available to power digital logic integrated circuit 110.

Current management system 105 mitigates and limits the voltage $V_L$ generated by parasitic inductances 130. In one embodiment, prior to the digital logic integrated circuit 110 switching operation, controllable current sink 140 of current management system 105 ramps a bypass current ($i_2$) up to an expected switching value $I_{switch}$ (shown in FIG. 3C at 332). In one embodiment, $I_{switch}$ is the expected current demand ($i_3$) digital logic integrated circuit 110 will draw during a switching operation. In one embodiment, the expected value of $i_3$ and the peak value and transition time for ramping bypass current $i_2$ is determined by one or more test methods as described in the '085 and '090 Applications herein incorporated by reference. Then, after the digital logic integrated circuit 110 switching operation, controllable current sink 140 ramps bypass current $i_2$ from $I_{switch}$ back to a steady state level (shown in FIG. 3C at 334). The resulting current ($i_1=i_2+i_3$) from power supply 120, shown generally in FIG. 3D at 340, comprises a first ramp 342, a plateau 344 and a second ramp 346. As would be appreciated by one skilled in the art upon reading this invention, the absence of abrupt current discontinuities in $i_1$ results in the generation of a transient parasitic voltage $V_L$ (shown in FIG. 3E at 350) that is significantly reduced compared to the spiking transient parasitic voltage $V_L$ (shown in FIG. 3F at 360) that would be produced by $i_3$ alone. Thus, the voltage ($V_{DLIC}$) available to power digital logic integrated circuit 110 is consistently maintained within specification limits throughout the switching operation.

In one embodiment, controllable current sink 140 determines when to ramp up and ramp down bypass current $i_2$ from a control signal provided by current controller 150 that is based on a priori information about the impending current needs of digital logic integrated circuit 110. The a priori information can be obtained in a number of ways as described below, or any other appropriate technique whether existing now or later developed.

For example, the a priori information can be obtained from micro-code running in parallel with digital logic integrated circuit 110. This would be special micro code that models and predicts digital logic integrated circuit 110 current demand. The output of the micro code would control controllable current sink 140 to reduce di/dt. The a priori information could also be generated by operating smaller, high-speed logic gates in parallel with the intended gates of digital logic integrated circuit 110, like large I/O cells. The smaller high-speed parallel logic gates generally do not require significant decoupling, yet they can provide early input to the controlled current sink to reduce di/dt.

Figure 2:
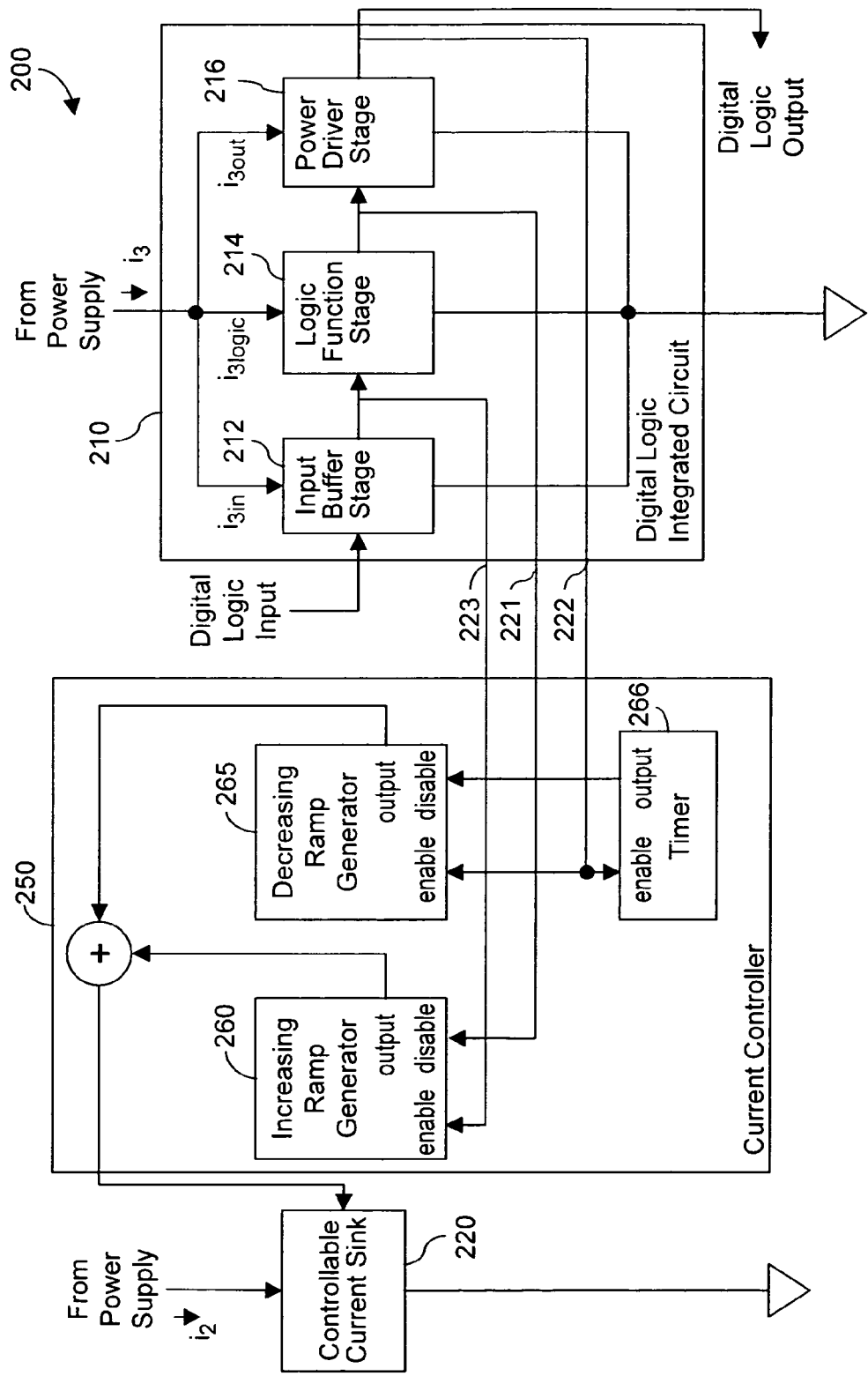
FIG. 2 is a diagram illustrating a current management system of one embodiment of the present invention.

FIG. 2 is a diagram illustrating a system 200 for communicating a priori switching information between a current controller 250 and a digital logic integrated circuit 210 of one embodiment of the present invention. In one embodiment, current controller 250 comprise an increasing ramp generator 260 adapted to output a control signal to a controllable current sink 220 to ramp bypass current $i_2$ from a steady state value (e.g. zero amps) to $I_{switch}$, as described with respect to FIG. 1. In one embodiment, current controller 250 also comprises a decreasing ramp generator 265 adapted to output a control signal to the controllable current sink 220 that ramps bypass current $i_2$ from $I_{switch}$ to the steady state value (e.g. zero amps), as described with respect to FIG. 1.

In one embodiment, the digital logic integrated circuit 210 comprises an input buffer stage 212, a logic function stage 214, and a power driver stage 216. During operation of digital logic integrated circuit 210, data from digital logic input signals are stored within input buffer stage 212. The data is then transferred to logic function stage 214, where one or more operations (e.g., NAND, NOR) are performed based on the function of digital logic integrated circuit 210. When logic function stage 214 is ready to output data, the data is transferred to the power driver stage 216 for output. The contribution of each of input buffer stage 212, logic function stage 214, and power driver stage 216 to the total current draw $i_3$ of digital logic integrated circuit 210 is illustrated by FIG. 3A at 310 by $i_{3in}$, $i_{3logic}$, and $i_3$out, respectively. In one embodiment, upon receiving digital logic input data at time $t_1$, input buffer stage 212 enables increasing ramp generator to ramp bypass current $i_2$ to $I_{switch}$ (illustrated by FIG. 3C at 332) via signal 223. Logic Function Stage 214 then disables (via signal 221) the output of increasing ramp generator 260 at time $t_2$, which is when $i_3$ steps to $I_{switch}$ to support the switching operations of digital logic integrated circuit 210. Signal 222 from power driver stage 216 then enables decreasing ramp generator 260 at time $t_3$, which is when $i_3$ steps from $I_{switch}$ back to its steady state value. At time $t_3$, decreasing ramp generator 260 begins to ramp bypass current $i_2$ back to steady state starting from $I_{switch}$. In one embodiment, a timer 266 is also enabled at time $t_3$ by power driver stage 216. At time $t_4$, an output signal from timer 266 disables the output of decreasing ramp generator 265. In one embodiment, the sum of the outputs from increasing ramp generator 260 and decreasing ramp generator 265 comprise the control signal provided to controllable current sink 220 from current controller 250.

261 As previously discussed digital logic integrated circuit 110 is not limited to small-scale integrated circuits, but in alternate embodiments, may comprise a high performance processor, such as, but not limited to, a microprocessor, a digital signal processor, and the like. In those cases the value for $I_{switch}$ will vary, increasing with the complexity of the synchronous logic path required within logic function stage 214 to complete a given operation. For such cases, in one embodiment, current controller 250 is configured to ramp bypass current $i_2$ to, and from, one of a plurality of $I_{switch}$ values, depending on the operation to be performed by logic function stage 214. In one embodiment, logic function stage 214 (via signal 221) identifies to current controller 250 which one of the plurality of $I_{switch}$ values should be used for the pending operation. The output of increasing ramp generator 260 is then disabled once that value of $I_{switch}$ is achieved. In one embodiment, one or both of increasing ramp generator 260 and decreasing ramp generator 265 vary their ramp rate based on the value of $I_{switch}$. For example, in one embodiment, increasing ramp generator 260 ramps bypass current $i_2$ at a relatively faster rate for larger values of $I_{switch}$ than for smaller values, to ensure that $I_{switch}$ is reached within the same time period (e.g., starting at time $t_1$ and finishing at time $t_2$ as shown by example in FIG. 3C) regardless of the value of $I_{switch}$. Note that for clarity of explanation, in FIGS. 3A-3F, all increasing and decreasing current ramps for bypass current $i_2$ are shown linearly increasing or linearly decreasing, with abrupt turn-on and turn-off at the beginning and the end of the current ramps. Also shown for clarity, $i_3$ is shown as a simplified pulse in FIG. 3B. However, one skilled in the art upon reading this specification would appreciate that $i_3$ will typically not be an ideal current pulse, and bypass current $i_2$ will typically be realized by gradual and generally non-linear increasing and decreasing current ramps, such that the sum of $i_2+i_3$ yields a low di1/dt.

FIG. 4 is a flow chart illustrating a method for digital circuit current management, of one embodiment of the present invention. The method begins at 410 with powering a digital logic integrated circuit with a power supply. The method then continues to 420 with ramping a bypass current from a steady state value to an expected digital logic device switching current value based on a-prior information of a pending logic operation. When both the bypass current and the digital logic device are supplied from the same digital logic power supply, ramping the digital logic power supply current to a value approximately equal to expected digital logic device switching current reduces discontinuities (i.e., step changes) in power supply current that result in voltage fluctuations. When the logic operation is complete, the method continues to 430 with ramping the bypass current from the expected digital logic device switching current value back to the steady state value. As discussed with respect to 420, ramping the digital logic power supply current from a value approximately equal to expected digital logic device switching current back to steady state also reduces discontinuities (i.e., step changes) in the power supply current. By reducing or eliminating step changes in the digital logic power supply current, voltages produced by parasitic inductances between a power supply and a digital logic integrated circuit are also reduced, thus stabilizing the voltage ($V_{DLIC}$) available to power digital logic integrated circuit.

Several means are available to implement the controllable current sink, current controller, and digital logic integrated circuit discussed above. These means include, but are not limited to, digital computer systems, programmable controllers, or field programmable gate arrays. Therefore other embodiments of the present invention are program instructions resident on computer readable media which when implemented by such processors, enable the processors to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A current management system for a digital logic circuit, the system comprising:
   a controllable current sink connected in parallel with a digital logic integrated circuit and adapted to draw a bypass current based on a control signal;
   a current controller responsive to the digital logic integrated circuit, the current controller adapted to output the control signal to the controllable current sink; and
   wherein the current controller is adapted to ramp the bypass current to a switching level based on a priori information about an impending current need of the digital logic integrated circuit and further adapted to ramp the bypass current from the switching level to a steady state level after the impending current need of the digital logic integrated circuit is completed.

2. The system of claim 1, the current controller further comprising:
   a first ramp generator adapted to cause the controllable current sink to ramp the bypass current from the steady state level to the switching level; and
   a second ramp generator adapted to cause the controllable current sink to ramp the bypass current from the switching level to the steady state level.

3. The system of claim 2, wherein one or both of the first ramp generator and the second ramp generator are adapted to ramp the bypass current based on one or more signals received from the digital logic integrated circuit.

4. The system of claim 3, wherein the digital logic integrated circuit comprises:
   an input buffer stage adapted to receive digital logic input data;
   a logic function stage adapted to perform one or more logic operations based on the digital logic input data;
   a power driver stage adapted to output digital data based on the one or more logic operations performed by the logic function stage;
   wherein the input buffer stage is further adapted to output a first signal to the first ramp generator, and the first ramp generator is adapted to ramp the controllable current sink from the steady state level to the switching level based on the first signal;
   wherein the logic function stage is further adapted to output a second signal to the first ramp generator, and the first ramp generator resets the controllable current sink to the steady state level based on the second signal; and
   wherein the power driver stage is farther adapted to output a third signal to the second ramp generator, and the second ramp generator is adapted to ramp the controllable current sink from the switching level to the steady state level the based on the third signal.

5. The system of claim 4, the current controller further comprising a timer adapted to receive the third signal, wherein the timer is adapted to reset the controllable current sink to the steady state level a designated time period after receiving the third signal.

6. The system of claim 1, wherein the switching level is a current magnitude based on an expected current demand of the digital logic integrated circuit when the digital logic integrated circuit is outputting the results of the one or more logic operations.

7. The system of claim 6, wherein the current controller is adapted to choose the current magnitude for the switching level from a plurality of current magnitudes based on which of the one or more logic operations are performed by the digital logic integrated circuit.

8. A method of current management for a digital logic circuit, the method comprising:
   drawing power to drive a digital logic integrated circuit;
   determining a priori information about an impending current need of the digital logic integrated circuit; and
   controlling a bypass current in parallel with the digital logic integrated circuit based on the a priori information, wherein the bypass current is controlled to reduce discontinuities in a current supplied to the digital logic integrated circuit.

9. The method of claim 8, further comprising:
   ramping the bypass current from a steady state value to an expected switching current value based on the a priori information; and
   when the impending current need of the digital logic integrated circuit is completed, ramping the bypass current from the expected switching current value back to the steady state value.

10. The method of claim 8, further comprising:
    receiving one or more signals from the digital logic integrated circuit, wherein the a priori information is provided by the one or more signals.

11. The method of claim 10, wherein the digital logic integrated circuit comprises an input buffer stage adapted to receive digital logic input data, a logic function stage adapted to perform one or more logic operations based on the digital logic input data, and a power driver stage adapted to output digital data based on the one or more logic operations performed by the logic function stage, the method further comprising:
    receiving a first signal from the input buffer stage, wherein the bypass current is ramped from the steady state level to the switching level based on the first signal;
    resetting the bypass current to the steady state level based on a second signal received from the logic function stage; and
    receiving a third signal from the power driver stage, wherein the bypass current is ramped from the switching level to the steady state level based on the third signal.

12. A digital logic circuit, the circuit comprising:
    a digital logic integrated circuit;
    a current management system coupled to the digital logic integrated circuit, the current management system including a controllable current sink connected in parallel with the digital logic integrated circuit and further including a current controller coupled to the controllable current sink; and
    wherein the controllable current sink is adapted to draw a bypass current from a digital logic power supply based on a control signal from the current controller, the current controller is adapted to control the bypass current based on a priori information about an impending current need of the digital logic integrated circuit, and wherein the bypass current is controlled to reduce discontinuities in the current supplied by the digital logic power supply.

13. The circuit of claim 12, wherein the current controller is adapted to ramp the bypass current from a steady state level to a switching level based on the a priori information; and
    wherein the current controller is further adapted to ramp the bypass current from the switching level to the steady state level after the impending current need of the digital logic integrated circuit is completed.

14. The circuit of claim 13, wherein the switching level is a current magnitude based on an expected current demand of the digital logic integrated circuit when the digital logic integrated circuit is outputting the results of the one or more logic operations.

15. The circuit of claim 14, wherein the current controller is adapted to choose the current magnitude for the switching level from a plurality of current magnitudes based on which of the one or more logic operations are performed by the digital logic integrated circuit.

16. The circuit of claim 12, wherein the current controller is further adapted to receive the a priori information based on one or more signals received from the digital logic integrated circuit.

17. A current management system for a digital logic circuit, the system comprising:
    means for controlling a bypass current, the means for controlling adapted to control the bypass current based on a priori information about an impending current need of a digital logic integrated circuit, wherein the bypass current is controlled to reduce discontinuities in a current supplied to the digital logic integrated circuit; and
    means for drawing the bypass current, the means for drawing the bypass current connected electrically in parallel with the digital logic integrated circuit and responsive to the means for controlling.

18. A computer-readable medium having computer-executable instructions for performing a method of current management for a digital logic circuit, the method comprising:
    determining a priori information about an impending current need of a digital logic integrated circuit; and
    controlling a bypass current in parallel with the digital logic integrated circuit based on the a priori information, wherein the bypass current is controlled to reduce discontinuities in a current supplied to the digital logic integrated circuit.

19. The computer-readable medium of claim 18 the method further comprising:
    ramping the bypass current from a steady state value to an expected switching current value based on the a priori information; and
    when the impending current need of the digital logic integrated circuit is completed, ramping the bypass current from the expected digital logic device switching current value back to the steady state value.

20. The computer-readable medium of claim 18 the method further comprising:
    receiving one or more signals from the digital logic integrated circuit, wherein the a priori information is provided by the one or more signals.

* * * * *